United States Patent [19]
Hughes

[11] Patent Number: 5,956,983
[45] Date of Patent: Sep. 28, 1999

[54] CYCLE LOCK

[76] Inventor: Robert M. Hughes, 67 Straw Hat Rd. Apt. 1B, Owings Mills, Md. 21117

[21] Appl. No.: 08/873,892

[22] Filed: Jun. 12, 1997

Related U.S. Application Data

[60] Provisional application No. 60/027,831, Oct. 10, 1996.

[51] Int. Cl.$^6$ ................................................. B62H 5/16
[52] U.S. Cl. .............................................. 70/227; 70/233
[58] Field of Search ................................. 70/14, 18, 233, 70/225, 226, 227, 234; 211/4.8

[56] References Cited

U.S. PATENT DOCUMENTS

| | | | |
|---|---|---|---|
| D. 259,764 | 7/1981 | Fouhy | D8/331 |
| 2,706,901 | 4/1955 | Jenkins . | |
| 4,135,374 | 1/1979 | Goral | 70/18 |
| 4,180,998 | 1/1980 | Hellman | 70/227 |
| 4,459,833 | 7/1984 | Waterkamp et al. | 70/227 |
| 4,571,965 | 2/1986 | LeRoux | 70/227 |
| 4,918,951 | 4/1990 | Kavizky | 70/39 |
| 5,069,049 | 12/1991 | Shieh | 70/227 |
| 5,265,451 | 11/1993 | Phifer | 70/226 |
| 5,365,758 | 11/1994 | Shieh | 70/38 R |
| 5,388,436 | 2/1995 | Shieh | 70/226 |

FOREIGN PATENT DOCUMENTS

| | | |
|---|---|---|
| 172115 | 8/1952 | Austria . |
| 73052 | 2/1948 | Norway ................................. 70/233 |
| WO87/01669 | 3/1987 | WIPO . |

*Primary Examiner*—Darnell M. Boucher
*Attorney, Agent, or Firm*—Richard C. Litman

[57] ABSTRACT

A locking mechanism for bicycle or motorcycle wheels. The mechanism is a through-the-wheel lock that has a hook that attaches to a stationary fixed object, such as a pole. A first embodiment of the invention has a holding bracket attached to one side of the vehicle's front fork. A locking bracket is mounted on the other side of the front fork, directly opposite the holding bracket. A locking cane having a U-shaped end hook includes a number of rachet teeth on the end of the cane opposite the end hook. The holding bracket has a first opening for holding the locking bar in an inoperative position, and a second opening for holding the locking cane in a position wherein the rachet teeth end of the cane inserts between the front wheel spokes and into engagement with the locking mechanism. The end hook is looped around a pole, (or other suitable stationary object), and the cane is pushed into the locking mechanism until the bar and cycle are snug. A second embodiment includes a swivel on the holding bracket for holding the locking cane in both the inoperative and operative positions.

7 Claims, 3 Drawing Sheets

CYCLE LOCK

CROSS-REFERENCE TO RELATED APPLICATION

This application claims the benefit of U.S. Provisional Patent Application Ser. No. 60/027,831, filed Oct. 10, 1996.

BACKGROUND OF THE INVENTION

1. Field of the Invention

The present invention relates to a cycle lock that is used to lock a bicycle or motorcycle to a vertical or horizontal bar.

2. Description of Prior Art

Many different devices are known for locking a wheel of a motorcycle or bicycle in a stationary position and/or locking the motorcycle or bicycle to a bar or pole. The prior art devices, however, require moving the lock from a storage location to an operative location. Many bicycles and motorcycles do not have storage areas, and the lock, or parts of the lock, can be misplaced or lost when removed from the cycle. In addition, many of these devices use a cable which is easily severed.

U.S. Pat. No. 2,706,901, issued Apr. 26, 1955 to Jenkins, discloses a lock for the front fork or rear of a bicycle that swivels from an operative to inoperative position. The Jenkins device is a closed loop however, and does not allow room for locking the bicycle to a post. U.S. Pat. No. 4,135,374, issued Dec. 3, 1979 to Goral, discloses a lock for a bicycle that extends around a pole, around both front forks, and through the spokes; however, no method for securing the lock in an inoperative position is disclosed. U.S. Pat. No. 4,180,998, issued Jan. 1, 1980 to Hellman, and U.S. Pat. No. 4,459,833, issued Jul. 17, 1984 to Waterkamp et al., each discloses a lock for bicycles wherein a bar is rotatable from a locking to a non-locking position. U.S. Pat. No. 4,571,965, issued Feb. 25, 1986 to LeRoux, and Norwegian Patent Document No. 73,052, published Feb. 2, 1948, disclose locking mechanisms for bicycles having a locking bar with a cane-shaped hook end. There is no provision in either disclosure for the cane to extend through the wheel spokes and around a pole.

Other patents relating to locking cycles via a wheel and fork include: U.S. Pat. No. D-259,764, issued Jul. 7, 1981; U.S. Pat. No. 4,918,951, issued Apr. 24, 1990 to Kavizky; U.S. Pat. No. 5,069,049, issued Dec. 3, 1991 to Shieh; U.S. Pat. No. 5,265,451, issued Nov. 30, 1993 to Phifer; U.S. Pat. No. 5,365,758, issued Nov. 22, 1994 to Shieh; and U.S. Pat. No. 5,388,436, issued Feb. 14, 1995 to Shieh; Austrian Pat. Document No. 172,115, published Aug. 11, 1952; and World Intellectual Property Organization Patent Document No. WO87/01669, published Mar. 26, 1987.

However, none of the above inventions and patents, taken either singularly or in combination, is seen to describe the instant invention as claimed.

SUMMARY OF THE INVENTION

The present invention is a locking mechanism for bicycle or motorcycle wheels. The mechanism is a through-the-wheel lock that has a hook that attaches to a stationary object, such as a pole. The mechanism consists of three parts: a holding bracket attached to one of either the front or rear fork of a cycle; a locking bracket attached to the other front or rear fork; and a locking cane for extending between the brackets, (through the front or rear wheel's spokes), and around a bar or pole.

A first embodiment of the invention has a pivoting holding bracket the holds the locking cane in a vertical inoperative position along the outer side of one of the vehicle's forks. The locking bracket is mounted on the other side of the front fork, directly opposite the holding bracket. The locking cane has a rounded end with a number of rachet teeth thereon. When it is desired to lock the cycle in a stationary position, the locking cane is first lifted straight up until the lower rounded end clears a holding loop on the bottom of the holding bracket. The holding loop avoids inadvertent pivoting of the cane which could result in the cane contacting the spokes while the cycle is in use. The cane is then tilted to a horizontal position by rotating the portion of the holding bracket that the cane extends through, relative to the remainder of the holding bracket. The cane can also be rotated 90° to allow the cane's end loop to be connected to a horizontal bar, (as opposed to a vertical post). After the end loop is around the bar or post, the cane is inserted into the holding bracket until the rounded end having the rachet teeth enters a hole in the locking bracket. The locking bracket includes an internal pawl for engaging the rachet teeth and prohibiting the cane from being removed from the locking bracket. A key lock enables a user to unlock the pawl, to remove the cane and unlock the cycle.

The second embodiment is identical to the first in all aspects except the holding bracket. The holding bracket of the second embodiment does not have a pivoting portion or a holding loop. The two positions of the locking cane are achieved by the use of a first vertical through hole for holding the locking bar in an inoperative position, and a second horizontal through hole for holding the locking bar in a position wherein the rachet teeth end of the bar inserts between the front wheel spokes and into engagement with the locking mechanism. In that this embodiment eliminates the possibility of the locking cane pivoting into engagement with the wheel spokes inadvertently, no holding loop is needed.

It is a principal object of the invention to provide an easy and secure device for locking a cycle via a wheel to a bar or post.

It is another object of the invention to provide a place to store a cycle lock on a cycle to avoid losing part or all of the lock.

It is an object of the invention to provide improved elements and arrangements thereof in a cycle lock for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
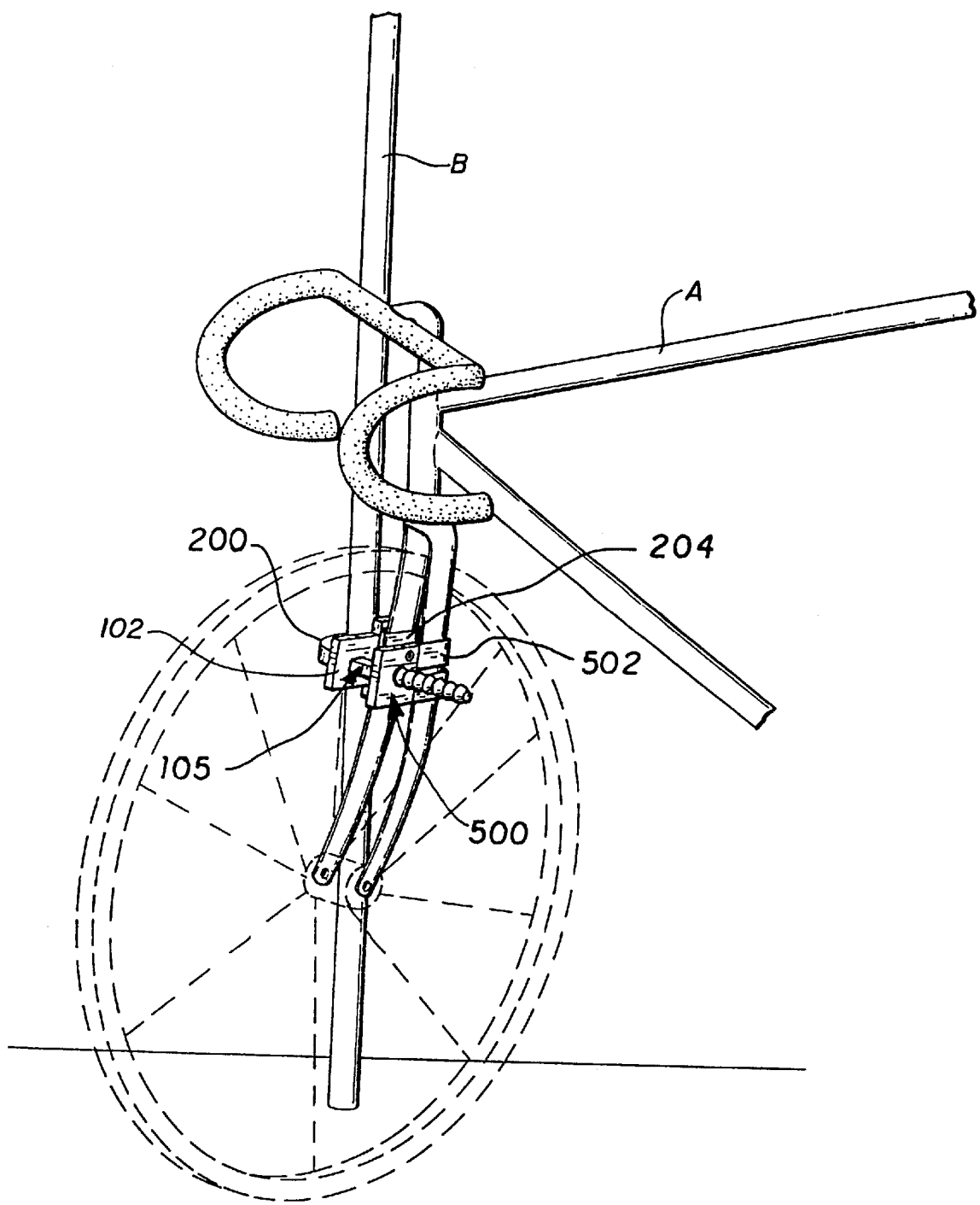
FIG. 1 is an environmental view of bicycle locked to a pole using the pivoting cycle lock according to the present invention.

FIG. 1 shows the present invention mounted on the front forks of a bicycle A, and being used to lock the bicycle A to a vertical post B. Two separate parts, the holding bracket 102 and the locking bracket 500, are each attached to a different one of the front forks of the bicycle A. The J-shaped locking cane 105 has a U-shaped end 200 that is wrapped around post B. The locking cane 105 passes through a hole in holding bracket 102, in turn through the spokes of the bicycle's front wheel, and through a hole in the locking bracket 101, thereby sandwiching the wheel in place.

Figure 2:
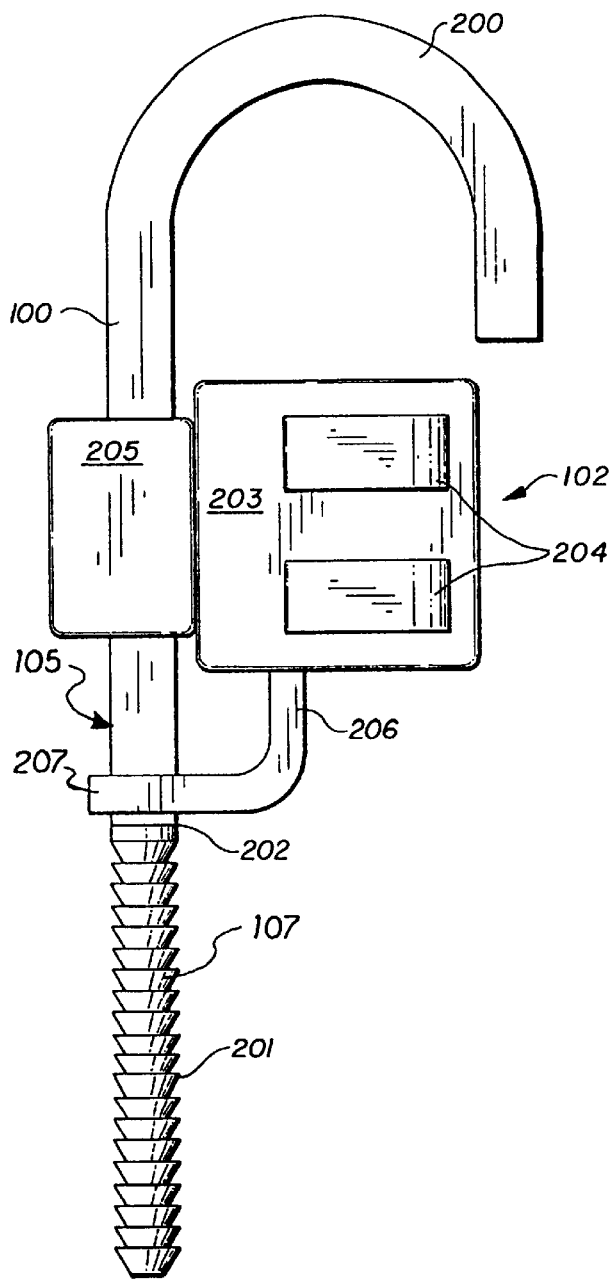
FIG. 2 is a side elevational view of the inwardly facing side of the pivoting holding bracket and locking cane of the cycle lock.
Figure 3:
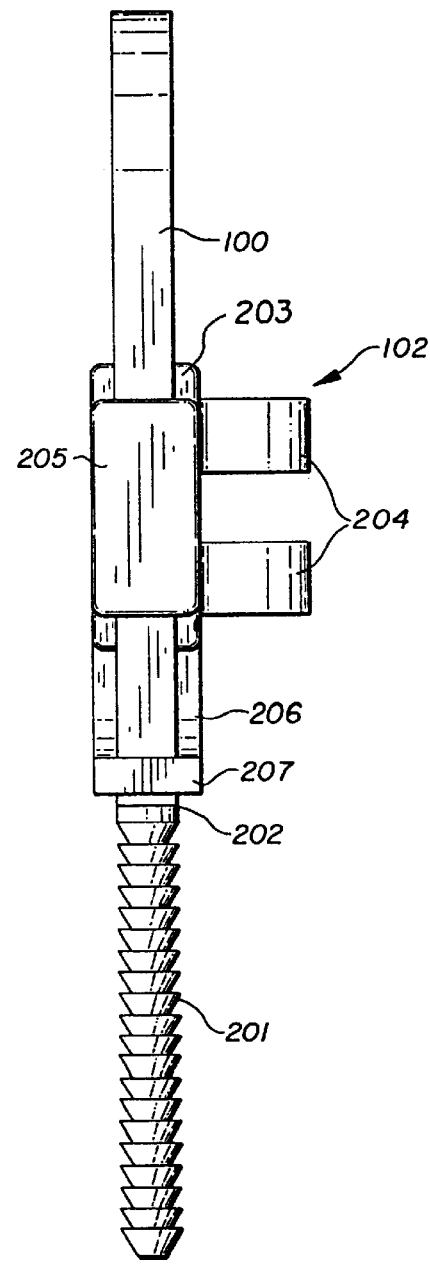
FIG. 3 is a front elevational view of the pivoting holding bracket and locking cane of the cycle lock.
Figure 4:
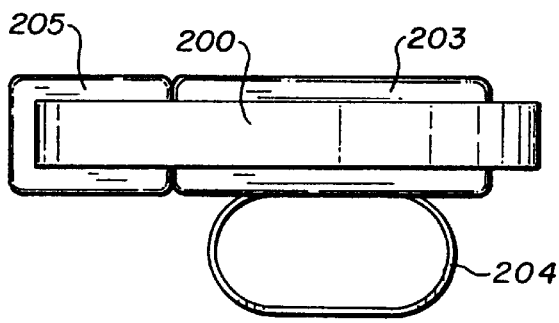
FIG. 4 is a top view of the pivoting holding bracket and locking cane of the cycle lock.

Details of the pivoting holding bracket 102, and the locking cane 105 can be seen in FIGS. 2–4. The pivoting holding bracket 102 comprises a pivoting portion 205 and a main body portion 203. The pivoting portion 205 has a square through-hole through which the locking cane 105 extends. The locking cane 105 has a first straight section 100 and a second straight section 107. The first straight section 100 is substantially square in cross section from the U-shaped end 200 to point 202, to prevent rotation of the cane in a locked position, i.e. the square cross-section of first section 100 engages with the square hole. The second straight section 107 has a circular cross section to allow rotation when passed through the hole. In addition, second straight section 107 includes a number of rachet teeth 201 for engaging the locking bracket 500.

The main body portion 203 includes two mounting straps 204 that hold the main body portion securely to a first fork arm of the front or rear fork of the cycle A. The mounting straps 204 may include a screw tightening arrangement (similar to hose clamps). Preferably however, these straps are permanently secured to the fork arm of the cycle A by any conventional manner, such as welding or gluing.

Pivoting portion 205 is attached to main body portion 203 using a bearing that allows portion 205 to rotate a full 360° about the main body portion 203, unless otherwise limited by holding loop 206. The holding loop 206 is a rigid arm which includes a square hole in lower portion 207 through which the locking cane 100 removably extends, thereby preventing the pivoting portion 205 from rotating. When the cycle lock is not in use, the mounting straps 204 position the holding bracket 102 on the forks so that the pivoting portion 205 can rotate about 90 degrees so that the locking cane 105 can be brought into a vertical position and generally parallel relative to the forks, as suggested by FIGS. 2–4. Thus, during use of the bicycle, the locking cane 105 remains attached vertically beside the fork of the cycle A and is secured in an upright attitude by virtue of the holding loop 206 which prevents the locking cane 105 from rotating and inadvertently engaging the spokes of the wheel, consequently avoiding serious accident or injury while the cycle A is in motion.

Figure 5:
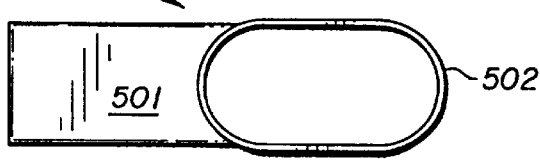
FIG. 5 is a top view of the locking bracket of the cycle lock.
Figure 6:
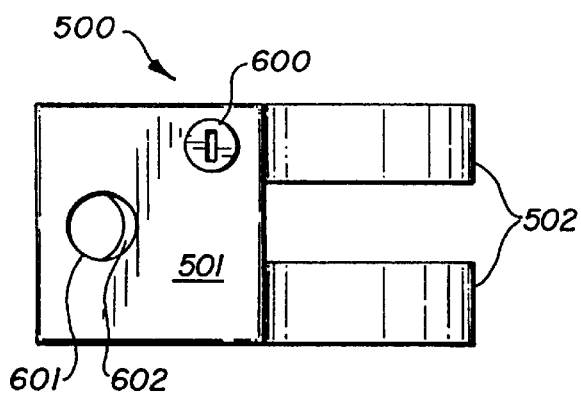
FIG. 6 is a side elevational view of the outwardly facing side of the locking bracket of the cycle lock.

The locking bracket 500 of the present invention is shown in detail in FIGS. 5 and 6. A main body portion 501 is attached to the opposite fork arm of the cycle A using mounting straps 502 in the same fashion as the mounting straps 204 of holding bracket 102, as set forth above. The main body portion has a round hole 601 for accepting the round end of straight section 107. Inside of hole 601 is a spring loaded locking pawl 602, that engages with the rachet teeth 201 to allow the locking cane 105 to enter the locking bracket 500 from the wheel side, but which will not allow the locking cane to be removed. A keylock 600 (conventionally including a cylinder, tumblers, and a bolt action) is provided to allow a user to disengage the pawl 602, by using a matching key. Upon the release of pawl 602, the locking cane 105 is withdrawn from the hole 601 of locking bracket, and cycle A is moved.

Figure 7:
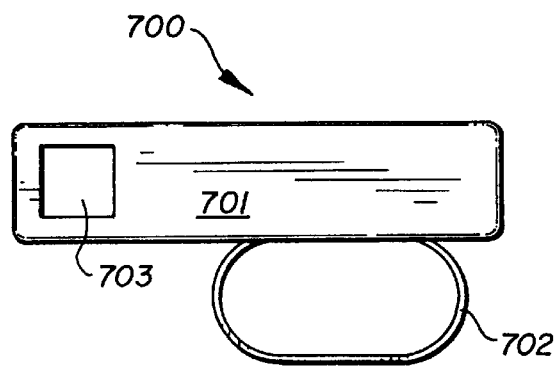
FIG. 7 is a top view of a non-pivoting embodiment of the holding bracket of the cycle lock, with the locking cane omitted to show details.
Figure 8:
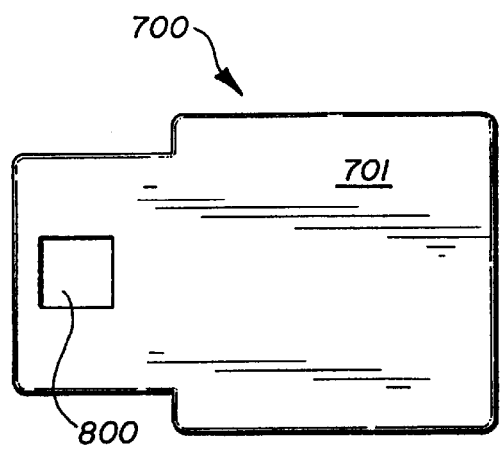
FIG. 8 is a side elevational view of the outwardly facing side of the non-pivoting embodiment of the holding bracket of the cycle lock, also with the locking cane omitted to show details.

A second embodiment of the present invention, as shown in FIGS. 7 and 8, uses the locking cane 105 and locking bracket 500 of the first embodiment, but replaces the pivoting holding bracket 102, with a unitary, non-pivoting holding bracket 700. The holding bracket 700 which has a main body portion 701 is attached to the first fork arm of the cycle A opposite the locking bracket 500. Mounting straps 702 are attached in the same fashion as mounting straps 204 of the holding bracket 102, as set forth above. However, in lieu of pivoting portion 205, the main body portion 701 of the unitary holding bracket 700 has a substantially square vertical hole 703 for holding the locking cane 105 in a non-locking position. A substantially square horizontal hole 800 is provided for holding the locking cane 105 in a locking position. The vertical hole 703 and the horizontal hole 800 thereby define a perpendicular relationship with one another. In this embodiment, both square holes 703 and 800 are sized and conformed to the square cross section of straight section 100.

METHOD OF USE

The cycle lock of the present invention provides a secure and easy way to lock a bicycle or motorcycle to a vertical post or horizontal bar, as well as securing a wheel of the cycle, (front or back depending on which forks the lock is attached to).

The operation of the first, pivoting embodiment will be explained herein, and reference should be made to FIGS. 1–3 and 6. When the lock is not in use, locking cane 105 is disposed vertically out of the way of a rotating front or rear wheel of the cycle. In order to use the lock to secure the cycle to a post or bar, (see FIG. 2), a user first lifts the locking cane 105 by grasping the U-shaped upper portion 200. The user raises the cane until the lowermost end of straight section 107 clears the holding loop 206. At this point, the locking cane 105 and pivoting portion 205 is rotated until the locking cane is horizontal (i.e., the lowermost end of the cane would be pointing directly out of the page in FIG. 2). The user then places the U-shaped portion 200 about the vertical post to which the cycle is to be locked.

If the user desires to lock the cycle to a horizontal bar, the locking cane 105 is raised until point 202 clears the top of the square hole in pivoting portion 205. Once the square section 100 of the locking cane 105 has been removed from the square hole in pivoting portion 205, the cane can be rotated 90° inside of the hole (i.e., the U-shaped portion would be pointing into the page in FIG. 2). As above, the locking cane 105 and pivoting portion 203 can then be rotated until the locking cane is horizontal (i.e., the lowermost end of the cane would be pointing directly out of the page in FIG. 2, and the U-shaped portion would be pointing downward). The user can then place the U-shaped portion 200 about a horizontal bar (not shown).

After placing the U-shaped portion 200 about the desired post or bar B, the locking cane is pushed into the pivoting portion 205, taking care not to strike the wheels spokes, until the ratchet teeth 201 engage the pawl 602 as discussed above. As the locking cane 105 is pushed into the pivoting portion 205, the bar is drawn by the U-shaped portion 200 until the bar is trapped between the U-shaped portion 200 and the main body portion 203. To unlock the cycle the user uses the key in keyhole 600 to unlock the pawl 602, and the above procedure is reversed.

The operation of the second non-pivoting embodiment will now be explained, and reference should be made to FIGS. 1 and 5–8. When the lock is not in use, locking cane 105 is disposed vertically in vertical hole 703 of main body 701, out of the way of the adjacent wheel of the cycle A. In order to use the lock to secure the cycle A to a post or bar B, a user removes the locking cane 100 by grasping the U-shaped upper portion 200 and raises the cane 100 until it is clear of hole 703. The user then places the U-shaped portion 200 about the post or bar B to which the cycle A is to be locked. After placing the U-shaped portion 200, about the desired post or bar B, the locking cane is pushed into the horizontal hole 800 of the unitary holding bracket 700, taking care not to strike the wheels spokes, until the ratchet teeth 201 engage the pawl 602 as discussed above. To unlock the cycle A, the user uses the key in keylock 600 to unlock the pawl 602, and the above procedure is reversed.

Although, the preferred embodiments have been disclosed, it is well within the scope of the invention to make modifications without departing therefrom. For example, the keylock 600 may be substituted with a combination type lock assemblage. It is to be understood that the present invention is not limited to the embodiments described above, but encompasses any and all embodiments within the scope of the following claims.

I claim:

1. A cycle lock comprising:
    a J-shaped locking cane having a straight portion defining a first section substantially square in cross section and a second section and a hooked portion extending integrally from said first section;
    a holding bracket adapted for attachment to a first arm of a fork of a cycle, said holding bracket including a substantially square through-hole for matingly engaging said first section of said locking cane; and
    a locking bracket adapted for attachment to a second arm of a fork of the cycle, said locking bracket including locking means for selectively engaging and securing said second section;
    whereby said locking cane, said locking bracket and said holding bracket can be brought into cooperation to secure the cycle to a stationary object.

2. The cycle lock according to claim 1, said second section of said straight portion of said locking cane including a plurality of ratchet teeth, and said locking means including a pawl for engaging said plurality of ratchet teeth.

3. The cycle lock according to claim 1, wherein said holding bracket comprises a main body portion for attachment to the second arm of the fork of the cycle and a pivoting portion having said substantially square through-hole.

4. The cycle lock according to claim 3, further comprising a holding loop depending from said main body portion and defining a substantially square hole for receiving said first section.

5. The cycle lock according to claim 3, wherein said main body portion includes a mounting strap.

6. The cycle lock according to claim 1, wherein said holding bracket defines a hole perpendicular to said through-hole.

7. The cycle lock according to claim 1, wherein said locking bracket includes a key lock.

* * * * *